United States Patent [19]

Fitzner et al.

[11] Patent Number: 4,501,201
[45] Date of Patent: * Feb. 26, 1985

[54] REMOVABLE TRAY FOR MICROPHONE STANDS

[76] Inventors: Marcel Fitzner, 1672 Cerro Gordo; Vesta P. Pinnell, Jr., P.O. Box 2894, both of Santa Fe, N. Mex. 87501

[*] Notice: The portion of the term of this patent subsequent to May 17, 2000 has been disclaimed.

[21] Appl. No.: 370,180

[22] Filed: Apr. 21, 1982

Related U.S. Application Data

[63] Continuation-in-part of Ser. No. 273,395, Jun. 15, 1981, Pat. No. 4,383,487.

[51] Int. Cl.³ .............................................. A47B 85/00
[52] U.S. Cl. ...................................... 108/27; 248/230; 108/150; 211/107
[58] Field of Search ........................ 108/27, 94, 95, 96, 108/150, 23; 248/230, 218.4, 456, 107, 56, 68 R; 24/248 B, 249 R, 255, 251; 312/223; 211/107, 26

[56] References Cited

U.S. PATENT DOCUMENTS

| | | | |
|---|---|---|---|
| 135,696 | 2/1873 | Dakin | 108/94 |
| 197,931 | 12/1877 | Haight | 108/94 |
| 268,244 | 11/1882 | Kurtis et al. | 211/107 |
| 475,149 | 5/1892 | Pearson | 211/107 X |
| 496,185 | 3/1893 | Bowling | 211/107 |
| 511,585 | 12/1893 | Carter | 248/456 |
| 2,182,496 | 12/1939 | Lemon | 211/107 X |
| 2,425,935 | 8/1947 | Hayman | 248/56 |
| 3,640,498 | 2/1972 | Aleks | 108/26 X |
| 4,117,629 | 10/1978 | Ekdahl | 211/107 |

FOREIGN PATENT DOCUMENTS

| | | | |
|---|---|---|---|
| 1120707 | 7/1956 | France | 248/56 |
| 641574 | 8/1979 | U.S.S.R. | 248/56 |

*Primary Examiner*—William E. Lyddane
*Assistant Examiner*—Peter A. Aschenbrenner
*Attorney, Agent, or Firm*—Cahill, Sutton & Thomas

[57] ABSTRACT

A removably mounted tray is clampable to a microphone stand or the like. The tray includes two pivotally attached half sections, each of which includes an indentation for receiving and engaging the stand and the cord from a microphone. A latch pivotally attached to one of the half sections engages a depending flange from each half section to mate the two half sections and retain the tray clamped to the stand.

8 Claims, 4 Drawing Figures

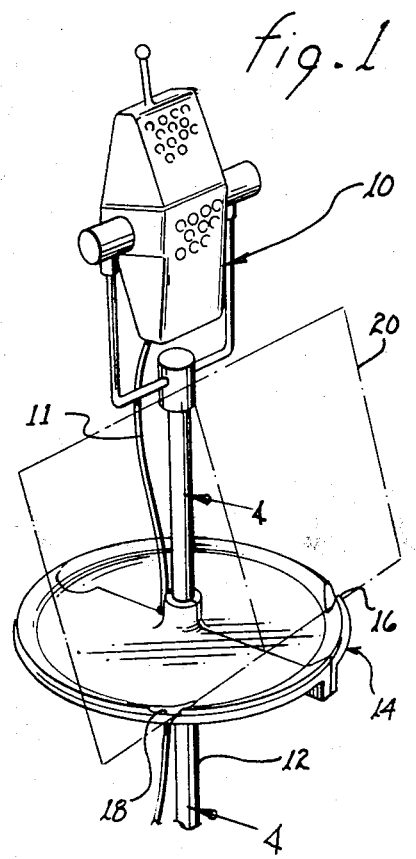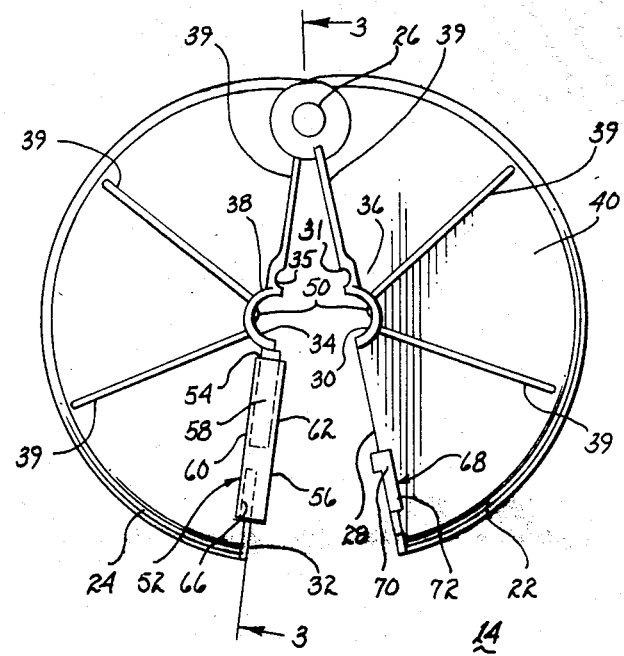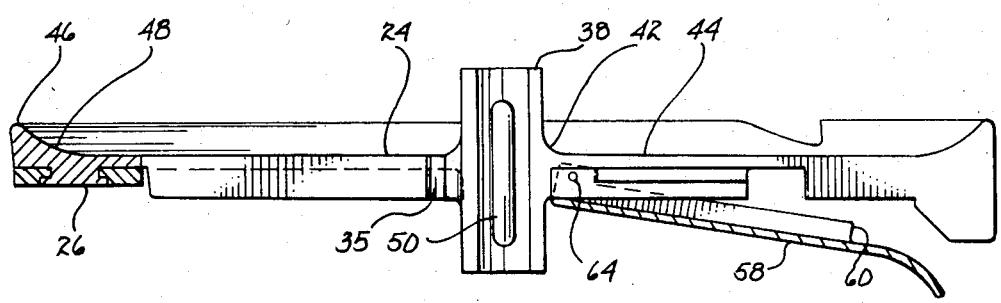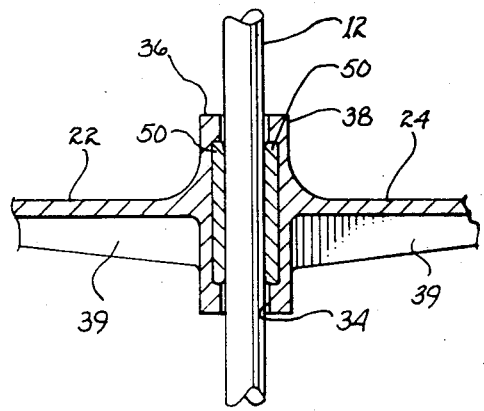

REMOVABLE TRAY FOR MICROPHONE STANDS

This application is a continuation-in-part application of a patent application entitled 'REMOVABLE TRAY FOR MICROPHONE STANDS', Ser. No. 273,395, filed on June 15, 1981, now U.S. Pat. No. 4,383,487, and assigned to the present assignee.

The present invention is related to trays and, more particularly, to trays detachably attachable to microphone stands.

Trays supported upon uprights serve the function of supporting various articles. In example, U.S. Pat. No. 2,596,541 discloses a pole mounted tray for supporting a garbage can. The tray is of lattice construction and has a central aperture for penetrably receiving a pole. A conduit concentric with the pole extends part way up the pole and the end thereof bears against the underside of the tray and serves as a support for the tray.

U.S. Pat. No. 1,754,998 discloses a tray for supporting fruit. This tray includes two half sections, each centrally apertured to a configuration commensurate with one half of the cross-section of the supporting upright. Depending diametric flanges of each half section are bolted to one another to secure the tray upon the upright. The tray is not intended to be readily or easily removable and such removal can only be accomplished by dismatling the tray.

U.S. Pat. No. 2,309,190 discloses a collapsible tiered tray for supporting edible articles. The multi-tiered tray unit includes a plurality of telescoping members forming the upright. Each of several of the members supports a tray and the plurality of trays are nestable within one another. When the upright is in the collapsed state, the plurality of trays are nested within one another to define a single useable tray and when the upright is extended, the trays present a plurality of tiered trays.

Musicians and vocalists who play instruments for musical accompaniment usually do so adjacent a microphone. The musicians usually must carry and have at their disposal various articles attendant to or used in conjunction with the particular musical instrument; in example, picks for strummed instruments, reeds for various wind instruments, etc. Furthermore, most musicians and vocalists want to keep drinks, cigarettes, etc., within arm's length. Moreover, many musicians use sheet music to expand their repertoire or for purposes of accommodating requests of their audience.

In the past, the various articles needed were often carried about in their pockets which made them difficult to reach without interruption or they were placed upon adjacent chairs, stands or other furnishings within arm's reach. The articles often fell off of such furnishings or otherwise became lost. Sheet music was propped up against any readily available furnishings or sheet music stands were employed, which stands imposed upon the musicians' freedom of movement, are awkward to transport from engagement to engagement, are misplaced and require floor space not always available.

The present invention is directed to a tray supportable upon any pole-like upright, such as an already existing microphone stand. The tray is configured to retain and prevent loss of the various musical instrument related articles and other things such as, cigarettes, matches, lighters, drinks, etc. Retainers are also provided to retain upright in combination with the microphone stand, sheet music or other documentation useful to the musician during his performance. The tray includes a clamping mechanism for readily attaching and detaching the tray from the microphone stand and accommodating pass through of a microphone cord whereby it becomes readily transportable from location to location.

It is therefore a primary object of the present invention to provide a detachably attachable upright supported tray.

Another object of the present invention is to provide an inexpensive detachably attachable tray supportable upon a microphone stand.

Yet another object of the present invention is to provide a microphone stand supported tray for musicians.

Still another object of the present invention is to provide a tray removably clampable to a microphone stand.

A further object of the present invention is to provide a tray having pivotally attached half sections for encircling and being supported by a vertical support.

A still further object of the present invention is to provide clamping apparatus for frictionally attaching a tray to an upright.

A yet further object of the present invention is to permit a microphone cord to be routed through the tray adjacent the stand.

These and other objects of the present invention will become apparent to those skilled in the art as the description thereof proceeds.

The present invention will be described with greater specificity and clarity with reference to the following drawings, in which:

FIG. 1 is a perspective view illustrating the tray mounted upon a microphone stand;

FIG. 2 is a bottom view illustrating components of the tray;

FIG. 3 is a cross-sectional view taken along lines 3—3, as shown in FIG. 2; and

FIG. 4 is a cross-sectional view taken along lines 4—4, as shown in FIG. 1.

Referring to FIG. 1, there is shown a microphone 10 and attached cord 11 depicted in stylized form and supported upon a conventional tubular stand 12. Such a microphone and stand are often used by musicians, whether standing or seated and whether or not they are vocalists or provide their own musical accompaniment. To provide a convenient place for keeping various articles used by a musician, such as picks, extra guitar strings, reeds, etc., tray 14 is attached to and supported upon stand 12. The tray may also serve the function of retaining eyeglasses, drinks, packs of cigarettes, matches and other articles used from time to time by the musician during an evening's performance.

Many musicians, to increase their repertoire, use sheet music for melodies or lyrics which have not yet been committed to memory. Accordingly, tray 14 includes retaining elements 16, 18 for engaging the lower edge of sheet music 20. The upper edge of the sheet music rests against stand 12 whereby a three point support for the sheet music is provided.

Referring jointly to FIGS. 2, 3, 4, the structural details of tray 14 will be described. The tray includes two half sections 22, 24 pivotally attached to one another by pivot means 26. Edge 28 of half section 22 includes an indentation 30 configured to correspond with the exterior configuration of a half cross-section of stand 12. Edge 32 of half section 24 includes a similarly configured indentation 34. These indentations receive and, when half sections 22 and 24 are joined, encircle stand 12 and serve as the mounting means for the tray. Edge 28 also includes an indentation 31 configured to correspond generally with a half cross-section of cord 11; edge 32 also includes a similar indentation 35. These indentations receive and, when half sections 22 and 24 are joined, encircle cord 11. Thereby, the cord, extending from microphone 10 is positioned generally adjacent stand 4 and will not intrude or impose upon any objects to be placed on tray 14. Moreover, the cord need not be routed laterally from the microphone past the perimeter of the tray and the inconvenience to use of the tray imposed by such routing is avoided.

To provide sufficient structural integrity and to prevent breaking of the mounting means through normal use of tray 14, the mounting means may comprise half cylindrical sections 36 and 38, the inner surfaces of which conform with indentations 30 and 34, respectively. Webs 39 extend radially from the half cylindrical sections along and attached to undersurface 40 of tray 14; the web halves within which indentations 31, 35 are formed may be widened, as shown, to accommodate the indentations. Some additional strength is achieved by radiusing intersection 42 intermediate the exterior surface of half cylindrical sections 36, 38 and upper surface 44 of tray 14.

The tray itself includes a lip 46 extending along the perimeter. This lip provides structural integrity to the planar surface of the tray. Additionally, if interior surface 48 of the lip slopes smoothly into and melds with upper surface 44, as illustrated, the articles placed upon the tray are easily slid off the tray without the need for picking them up and lifting them off the tray. This benefit is subtle but important as articles such as picks are difficult to grasp sufficiently well to lift when they rest upon a planar surface.

Although indentations 30 and 34 conform generally relatively closely to the exterior dimensions of stand 12, some slippage therebetween may occur due to wear, nature of surface finish of the stand, etc. To preclude the possibility of any such slippage, inserts 50 are disposed in each half cylindrical section. Each insert is a length of compressible high friction materials, such as a strip of rubber. As the insert extends radially inwardly of the indentation within which it is placed, it will be compressed upon engagement of the indentation with a stand. Such compression will result in substantial frictional interference and will preclude both vertical slipping of the tray along the stand and rotation of the tray about the longitudinal axis of the stand.

To engage and disengage tray 14 from stand 12 and microphone cord 11, latch means 52 is employed. The latch means includes a flange 54 depending from half section 24 along and bisected by edge 32. A latch 56 includes a base member 58 and side members 60 and 62 extending from the base member. The side members are spaced apart from one another so as to slidingly engage the corresponding sides of flange 54 upon pivotal movement of latch 56 about pivot point 64. A further flange 66 is disposed in radial alignment with and outward of flange 54 along edge 32. It is of a width half that of flange 54 and one side of it is coincident with edge 32.

A further flange 68 extends from undersurface 40 of half section 22 adjacent edge 28. This flange includes a widened element 70 which straddles edge 28 and is of a width equivalent to that of flange 54 and the spacing intermediate side members 60 and 62 of latch 56. A narrowed element 72 of flange 68 is one half the width of widened element 70 and terminates commensurate with edge 28. The combined width of flange 66 and narrowed element 72 is equivalent to the spacing intermediate side members 60 and 62 of latch 56. The length of widened element 70 is commensurate with spacing intermediate flange 54 and flange 66.

Upon pivoting of half sections 22 and 24 to bring edges 28 and 32 adjacent one another and enclose the stand and cord therebetween, widened element 70 will nest intermediate flange 54 and flange 66 and narrowed element 72 will be located adjacent flange 66. Subsequent pivotal movement of latch 56 upwardly toward undersurface 40 of tray 14 will engage edges 60 and 62 with opposed sides of flanges 54, 68 and 66 and maintain them in alignment with one another. Thereby, the latch easily and readily locks half sections 22 and 24 to one another. Unlocking is readily and easily effected by downward pivotal movement of the latch.

In its most simple form, tray 12 can be readily manufactured from five parts. Half section 22, half section 24, latch 56, a pin serving as pivot point 64 and inserts 50. It is presumed that pivot means 26 comprises any one of many well known means for effecting pivotal movement between two parts without the need for pivot pins, bushings, etc. In example, a stud may extend from one half section for snap fit engagement with an aperture formed in the other half section. The resulting assembly of the parts to form tray 14 is readily and easily performable by unskilled workers with only minimal training.

All of the components of tray 14 are readily formable by various plastic manufacturing techniques, such as injection molding. The use of these techniques, in combination with low cost plastic materials, render the cost of manufacture of the components very low. Accordingly, tray 14 is easily manufacturable, assembleable and is inexpensive.

In use, tray 14 is attached to stand 12 and cord 11 or any upright grippable by the indentations within half cylindrical sections 36, 38. Attachment is effected by pivoting latch 56 downwardly, pivoting the half sections about pivot point 26 to permit insertion of the stand and cord intermediate edges 28, 32 into proximity with the half cylindrical sections and indentations, respectively. Thereafter, half sections 22 and 24 are pivoted toward one another and clamped to one another by pivoting latch 56 toward undersurface 40. Such pivotal movement of the latch will cause side members 60 and 62 to lock flange 68 adjacent and intermediate flanges 54 and 66 and the tray becomes mounted upon the stand. Separation of edges 28 and 32 and removal of the tray cannot be effected except upon pivotal movement of the latch. Disengagement is effected by simply pivoting latch 56 away from undersurface 40 to release flange 68. Thereafter, separation of edges 28 and 32 by pivoting half sections 22 and 24 away from one another will release stand 12 and cord 11 and the tray may be removed from thereabout.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

We claim:

1. A detachably attached tray for stands supporting a microphone and cord depending therefrom, said tray comprising in combination:
   (a) a first section for defining a part of said tray and including a first edge;
   (b) a second section for defining the remaining part of said tray and including a second edge;
   (c) pivot means for pivotally attaching said first section to said second section;
   (d) mounting means disposed within said first and second edges for encircling the stand on pivoting of said first and second sections toward one another to mate said first and second edges;
   (e) indentation means disposed within said first and second edges for encircling the cord on pivoting of said first and second sections toward one another to mate said first and second edges;
   (f) a first and third flange depending from said first section;
   (g) a second flange depending from said second section, said second flange being positionable intermediate said first and third flanges on mating of said first and second edges; and
   (h) latch means for maintaining said second flange intermediate said first and third flanges to maintain said mounting means in engagement with the stand.

2. The tray as set forth in claim 1 wherein said mounting means includes a half cylindrical section attached to each of said first and second sections, each said half cylindrical section being oriented normal to the plane of said tray.

3. The tray as set forth in claim 2 including radially oriented web means interconnecting each said half cylindrical section and the undersurface of the attached one of said first and second sections.

4. The tray as set forth in claim 3 wherein one said indentation means is formed within one of said webs upon latching of said first and second sections.

5. The tray as set forth in claim 2 wherein each of said first and second sections has a half circular perimeter.

6. The tray as set forth in claim 5 including friction means disposed in each of said half cylindrical sections for inhibiting slippage between said tray and the stand.

7. The tray as set forth in claim 1 including a lip disposed at the perimeter of each of said first and second sections.

8. The tray as set forth in claim 7 including retaining elements disposed in said lip for retaining documentation.

* * * * *